United States Patent [19]

Hijikata et al.

[11] Patent Number: 4,914,065

[45] Date of Patent: Apr. 3, 1990

[54] PROCESS FOR REGNERATING CERAMIC HONEYCOMB FILTERS BY COMBUSTION

[75] Inventors: Toshihiko Hijikata; Toshiaki Higuchi, both of Nagoya, Japan

[73] Assignee: NGK Insulators, Ltd., Japan

[21] Appl. No.: 260,025

[22] Filed: Oct. 20, 1988

[30] Foreign Application Priority Data

Nov. 12, 1987 [JP] Japan .................. 62-284106

[51] Int. Cl.$^4$ .................. B01J 38/14; B01J 38/12; B01D 53/36; F23N 3/00
[52] U.S. Cl. .................. 502/52; 423/215.5; 502/38
[58] Field of Search .................. 502/52, 49, 38, 20, 502/21; 423/215.5

[56] References Cited

U.S. PATENT DOCUMENTS

| | | | |
|---|---|---|---|
| 2,235,166 | 5/1941 | Pyzel .................. | 502/52 |
| 4,451,441 | 5/1984 | Ervett et al. .................. | 423/215.5 |
| 4,828,807 | 5/1989 | Domesie et al. .................. | 423/215.5 |

FOREIGN PATENT DOCUMENTS 27658 6/1986 Japan .................. 502/38

*Primary Examiner*—Paul E. Konopka
*Attorney, Agent, or Firm*—Arnold, White & Durkee

[57] ABSTRACT

The invention relates to a process for regenerating ceramic honeycomb filters by removing soot heaped thereon through combustion, which comprises the steps of controlling the combustion of the soot such that a time t (minutes), required for raising a temperature of an exhaust gas from a soot-ignition temperature, Tig, to Tig+200° C., satisfies the following inequality.

$$t \geq \frac{S \cdot T_{ig}}{Q \cdot V^{0.2}} \times 7 \times 10^{-4}$$

in which:
Q: a total flow rate of the waste gas per unit volume of the filter in the initial stage (Nm$^3$/min/l)
V: the volume of the filter (l); and
S: heaped soot per unit volume of the filter (g/l).

3 Claims, 2 Drawing Sheets

PROCESS FOR REGENERATING CERAMIC HONEYCOMB FILTERS BY COMBUSTION

BACKGROUND OF THE INVENTION (1) Field of the Invention

The present invention relates to a process for regenerating ceramic honeycomb filters by removing soot heaped on partition walls thereof through combustion.

(2) Related Art Statement

In ceramic honeycomb filters used in diesel engines or the like, in order to remove soot filtered off from exhaust gases and heaped on partition walls, it is necessary that the soot is removed by combustion after use during a given time period to regenerate the ceramic honeycomb filters.

According to a conventional process for combusting such soot, amounts of a fuel and combustion air are set such that temperatures of waste gases are made sufficiently higher than an ignition temperature of the soot (soot-ignition temperature) so as to enable complete combustion thereof, and these amounts are set at constant values during soot combustion, respectively.

However, in the above regenerating process, since the waste gas having a temperature well higher than the soot-ignition temperature is at one time fed to the ceramic honeycomb filter from the beginning of the soot combustion, soot heaped on the partition walls is rapidly combusted at once. Consequently, there is a problem in that the ceramic honeycomb filter may break or melt.

SUMMARY OF THE INVENTION

It is an object of the present invention to solve the above-mentioned problem, and to provide a process for regenerating ceramic honeycomb filters by combusting while preventing rapid temperature increases due to the soot combustion during regeneration of the ceramic honeycomb filters.

The process for combustion-regenerating ceramic honeycomb filters by removing heaped soot through combustion according to the present invention is characterized in that the combustion of soot is controlled by making a time (minute) during which the temperature of the waste gas rises from Tig (°C.) to Tig+200° C. [Tig: soot-ignition temperature satisfy the following equation.

$$t \geq \frac{S \cdot T_{ig}}{Q \cdot V^{0.2}} \times 7 \times 10^{-4}$$

in which:

Q: a total flow rate of the waste gas per unit volume of the filter in the initial stage (Nm³/min/l)
V: the volume of the filter (l); and
S: a heaped soot per unit volume of the filter (g/l).

In the above process, the rapid temperature rise due to the combustion-removal of soot during regeneration of the ceramic honeycomb filter is prevented by controlling the temperature of the waste gas to be fed to the ceramic honeycomb filter such that the time required to raise the temperature of the waste gas over the specified temperature range may be set at not less than a lower limit value determined by the above equation.

These and other objects, features, and advantages of the invention will be appreciated upon reading the following description of the invention when taken in conjunction with the attached drawings, with the understanding that some modifications, variations and changes of a same could be made by the skilled person in the art to which the invention pertains, without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

Figure 1:
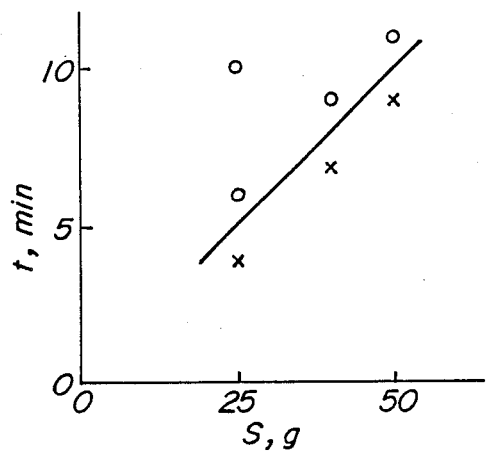
FIG. 1 is a graph showing the relationship between the time (t) required for raising the temperature of the waste gas from Tig to Tig+200° C. and the amount of soot heaped.

In the present invention, it was determined that the ceramic honeycomb filter can be regenerated without being broken or melted by raising the temperature of the waste gas during heating in a time period satisfying the above equation over the specified temperature range.

Preferably, the temperature of the waste gas is rapidly raised to the soot-ignition temperature Tig in 1 minute by heating, because a time required for regeneration is shortened in that case. Further, it is also preferable to raise the temperature of the waste gas such that a heat curve is straight (heating a straight heating curve means that heating is effected such that the temperature linearly increases by heating with respect to a lapse of time).

The waste gas is intended to mean a waste gas coming from an internal combustion engine such as a diesel engine, etc. The time (t) required for raising the temperature from Tig to Tig+200° C. may be controlled by, for instance, mixing cooling air into the waste gas.

The present invention will be explained in more detail with reference to the following specific Examples.

Cylindrical ceramic honeycomb filters made of cordierite were prepared. These cylindrical ceramic honeycomb filters had various soots possessing different soot-ignition temperatures, filter volumes, and heaped soot amounts as shown in the following Table 1, respectively. Each of the honeycomb filters was regenerated by combusting the soot, while amounts of combustion air and cooling air and a time required to raise the temperature from the soot-ignition temperature, Tig, to Tig+200° C. were varied. First, diesel oil was combusted with the combustion air, and the time was controlled by mixing the cooling air into the waste gas obtained by combustion before the waste gas entered the filter. The temperature of the thus controlled waste gas was measured 20 mm upstream from the filter. Heating was carried out such that the temperature was raised to the Tig in one minute and that the heating curve in a range from Tig to Tig+200° C. was straight. At that time, the maximum temperature inside the filter was measured during regeneration by combustion, and damages of the filters after combustion-regenerating were visually examined. Results are shown in Table 1. In Table 1, filters not damaged or those damaged as visually judged are indicated by ○ and x, respectively.

TABLE 1(a)

| Soot | Filter volume (l) (filter size) | Heaped soot amount (g) | Combustion air | Flow rate (Nm³/min) cooling air initial stage | flowing-termination time | total flow rate initial stage | flowing-termination time | Time in heating waste gas from Tig to Tig + 200° C. | Experimental results maximum temperature inside filter (°C.) | filter damage |
|---|---|---|---|---|---|---|---|---|---|---|
| A (Tig:450° C.) | 2.5 (5.66 "D × 6" L) | 25 | 0.3 | 1.0 | 0.4 | 1.3 | 0.7 | 10 | 760 | ○ |
| | | | | | | | | 6 | 990 | ○ |
| | | | | | | | | 4 | 1070 | X |
| | | | 0.6 | 2.0 | 0.8 | 2.6 | 1.4 | 3 | 950 | ○ |
| | | | | | | | | 2 | 1100 | X |
| | | | | | | | | 2 | 1060 | ○ |
| | | | 0.9 | 3.0 | 1.2 | 3.9 | 2.1 | 1 | 1160 | X |
| | | | | | | | | 9 | 1000 | ○ |
| | | 40 | 0.3 | 1.0 | 0.4 | 1.3 | 0.7 | 7 | 1100 | X |
| | | | | | | | | 11 | 980 | ○ |
| | | 50 | 0.3 | 1.0 | 0.4 | 1.3 | 0.7 | 9 | 1110 | X |
| | | | | | | | | 4 | 880 | ○ |
| | | 50 | 0.9 | 3.0 | 1.2 | 3.9 | 2.1 | 3 | 1090 | X |
| | | | | | | | | 4 | 910 | ○ |
| A (Tig:450° C.) | 5.1 7.5 "D × 7" L | 50 | 0.9 | 3.0 | 1.2 | 3.9 | 2.1 | 2 | 1070 | X |
| | | | | | | | | 3 | 1010 | ○ |
| | 12.5 (9 "D × 12" L) | 50 | 0.9 | 3.0 | 1.2 | 3.9 | 2.1 | 2 | 1190 | X |
| | | | | | | | | 8 | 920 | ○ |
| | | 150 | | | | | | 7 | 1080 | X |
| B (Tig:510° C.) | 2.5 (5.66 "D × 6" L) | 25 | 0.3 | 1.0 | 0.4 | 1.3 | 0.7 | 6 | 970 | ○ |
| | | | | | | | | 5 | 1120 | X |
| C (Tig:550° C.) | | | | | | | | 7 | 960 | ○ |
| | | | | | | | | 6 | 1080 | X |

(Note) Tig: Soot-ignition temperaure
Initial stage: Combination starting time [waste gas temperature: Tig(°C.)]
Flowing termination time: Combustion-terminated time [waste gas temperature: Tig + 200(°C.)]

Figure 2:
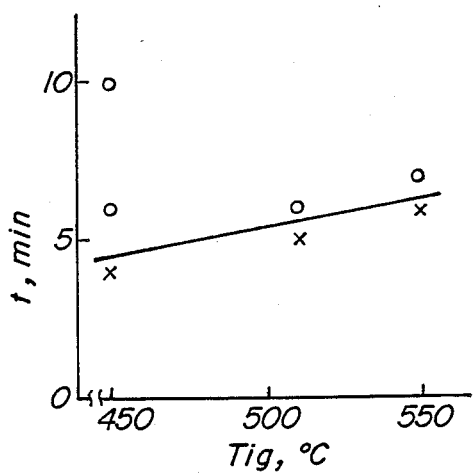
FIG. 2 is a graph showing the relationship between the temperature rising time (t) and the soot-ignition temperature (Tig)
Figure 3:
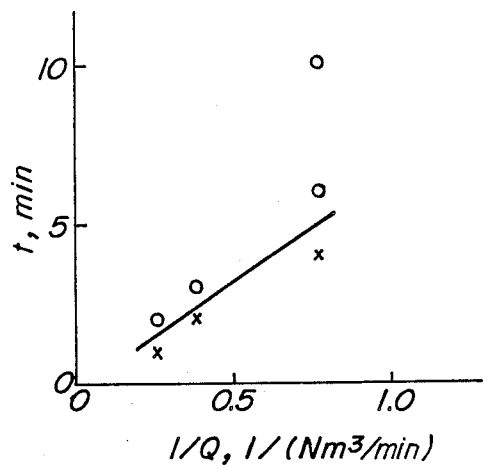
FIG. 3 is a graph showing the relationship between the temperature rising time (t) and the reciprocal of the total flow rate (Q) of the waste gas in the initial stage.
Figure 4:
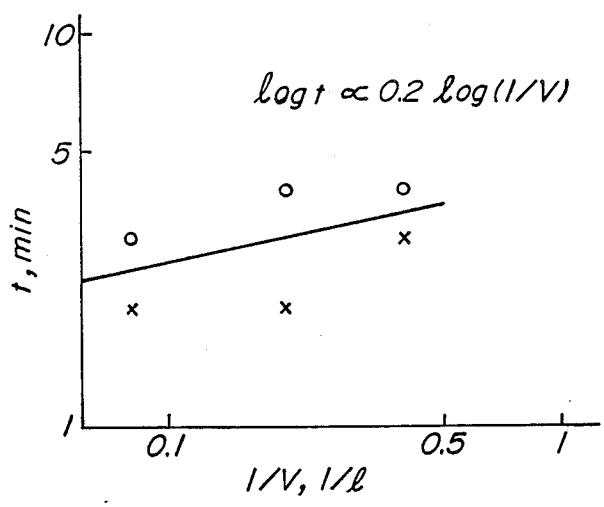
FIG. 4 is a graph showing the relationship between the temperature rising time (t) and $(1/V)^{0.2}$.

As is seen from the results of Table 1, the filters having shorter heating times required for raising Tig to Tig+200° C. were conspicuously damaged. Based upon the above results, in order that the minimum heating time (t) (which is required for raising Tig to Tig+200° C. and during which time no damage is produced) may be determined, the total flow rate (Q) of the waste gas per unit volume of the filter in the initial stage, the filter volume (V), the amount (S) of soot heaped per unit volume of the filter, the soot-ignition temperature (Tig), and the relations between the heating time and the above factors were examined as shown in FIGS. 1 through 4. As is seen from the results in FIGS. 1 through 4, the heating time (t) is in proportion to each of S, Tig, 1/Q, and $(1/V)^{0.2}$. By calculating a proportionality constant thereof, the following relationship was determined.

$$t \geq \frac{S \cdot Tig}{Q \cdot V^{0.2}} \times 7 \times 10^{-4}$$

As a matter of course, the present invention is not limited to the above-mentioned examples, but many modifications, variations, and changes may be made. For instance, in the above examples the temperature was raised up to Tig in one minute and the heating curves in the range from Tig to Tig+200° C. were straight, as preferred embodiments. However, the present invention is exclusively characterized in that the minimum time required for raising Tig to Tig+200° C. is specified, and thus the heating time required to raise the temperature of the waste gas to Tig and the profile of the heat curve are arbitrary.

In addition, in the above Examples although the temperature of the waste gases was controlled by adding the cooling air to the waste gas, this is not restrictive. For example, a feed amount of fuel or an amount of air may be controlled, or the concentration of oxygen in the waste gases may be controlled.

As is clear from the aforegoing detailed description, according to the process for burning the ceramic honeycomb filters in the present invention, the ceramic honeycomb filters can be regenerated by heating in a shortened time without being broken or melted by determining the minimum time required for raising the soot-ignition temperature, Tig, to Tig+200° C.

What is claimed is:
1. A process for regenerating ceramic honeycomb filters by removing soot deposited thereon through combustion, which comprises the step of controlling the combustion of the soot such that a time t (minutes), required for raising a temperature of an exhaust gas from a Tig, soot-ignition temperature, to a Tig+200° C., satisfies the following equation:

$$t \geq \frac{S \cdot T_{ig}}{Q \cdot V^{0.2}} \times 7 \times 10^{-4}$$

wherein

Q is the total flow rate of the waste gas per unit volume of said filters in the initial stage of soot ignition ($Nm^3/min/l$);

V is the volume of said filters (1); and

S is the heaped soot per unit volume of said filters (g/l).

2. The regenerating process of claim 1, wherein the temperature is raised to the Tig in one minute.

3. The regenerating process of claim 1, wherein the temperature is raised such that a heating curve in a temperature ranging from the Tig to the Tig+200° C. is linear.

* * * * *